United States Patent [19]
Crute

[11] 3,938,692
[45] Feb. 17, 1976

[54] PRESSURE-VACUUM RELIEF FUEL TANK CAP WITH ROLL-OVER SAFETY VALVE FEATURE

[75] Inventor: Billy G. Crute, Connersville, Ind.
[73] Assignee: Stant Manufacturing Company, Inc., Connersville, Ind.
[22] Filed: Sept. 30, 1974
[21] Appl. No.: 510,483

[52] U.S. Cl. .............. 220/203; 137/43; 137/533.11; 137/533.15; 220/303
[51] Int. Cl.² ......................................... B65D 51/16
[58] Field of Search ........... 220/203, 303, 246, 206; 137/43, 493, 493.6, 533.11, 533.15, 533.13

[56] References Cited
UNITED STATES PATENTS

| | | | |
|---|---|---|---|
| 2,735,571 | 2/1956 | Lockwood | 220/246 |
| 2,757,223 | 7/1956 | Duncan | 137/43 |
| 2,995,148 | 8/1961 | Novak et al. | 137/493.6 |
| 3,140,794 | 7/1964 | Arndt et al. | 220/303 |
| 3,153,423 | 10/1964 | Biello et al. | 137/493.6 |
| 3,289,876 | 12/1966 | DePew | 220/246 |
| 3,386,611 | 6/1968 | Crute | 220/303 |
| 3,610,263 | 10/1971 | Walters | 220/202 |
| 3,724,707 | 4/1973 | Burgess | 220/203 |
| 3,757,987 | 9/1973 | Marshall | 137/43 |
| 3,820,680 | 6/1974 | Friend | 220/203 |

FOREIGN PATENTS OR APPLICATIONS

| 908,989 | 4/1946 | France | 137/493 |
|---|---|---|---|

*Primary Examiner*—William Price
*Assistant Examiner*—Allan N. Shoap
*Attorney, Agent, or Firm*—Jenkins, Hanley & Coffey

[57] ABSTRACT

A pressure-vacuum cap for a chamber such as an automobile gas tank having a normally upwardly extending filler neck formed with a peripherally and radially extending, upwardly facing sealing surface concentric with the longitudinal axis of the neck, the cap comprising a cover, a concentric housing extending downwardly from the cover into the filler neck and a gasket or gaskets providing a seal between the housing and the sealing surface, the housing providing a valve body having a centrally disposed, concentric passageway extending axially therethrough and in communication with the chamber. A pressure-vacuum valve arrangement is disposed in that passageway for normalizing the pressure in the chamber, venting the chamber to atmosphere when the pressure in the chamber exceeds a predetermined superatmospheric level and when the pressure in the chamber drops below a predetermined subatmospheric level. The valve body also provides, in addition to the pressure-vacuum valve arrangement, a roll-over valve feature. Particularly, the passageway defines a downwardly facing, generally spherical valve seat, and a ball is disposed in the passageway to move against the valve seat to close the passageway against movement of fluid from the chamber when the filler neck is tilted downwardly to a predetermined angle relative to a horizontal plane.

5 Claims, 3 Drawing Figures

PRESSURE-VACUUM RELIEF FUEL TANK CAP WITH ROLL-OVER SAFETY VALVE FEATURE

The present invention relates to fuel storage tank caps, and more particularly to the provision of a cap for an automobile fuel tank, which cap has valve means therein for venting the chamber to atmosphere when the pressure in the chamber exceeds a predetermined superatmospheric level and when the pressure in the chamber drops below a predetermined subatmospheric level and, in addition, roll-over valve means effective to prevent the flow of gas through the pressure-vacuum valve means if the automobile is rolled over in an accident. The pressure-vacuum valve means comprises, generally, a pair of valves which are normally closed and which automatically open in response to predetermined pressure changes in the fuel tank. One valve, the pressure valve, functions to release excess vapors in the tank when the pressure exceeds a predetermined level. The other valve, the vacuum valve, functions to control the inhalation of atmospheric air when the pressure in the tank drops below a predetermined subatmospheric level. The pressure-vacuum valve arrangement is designed and required for protection of the environment.

The prior art contains several examples of inventors' efforts to solve the problem of providing pressure-vacuum valves and even roll-over valves in caps of fuel tanks. U.S. Pat. No. 3,757,987 issued Sept. 11, 1973 in U.S. Class 220/44R, 137/43 discloses a cap with a combination pressure-vacuum valve and roll-over valve on the filler neck of a fuel tank. The Dawson Friend U.S. Pat. No. 3,820,680 issued June 28, 1974 in U.S. Class 220/39 R, 220/44 R, 220/46 R discloses a gas cap with the pressure-vacuum valve means therein. Such a pressure-vacuum valve means is also disclosed in the Robert Rodgers patent application Ser. No. 307,821, now U.S. Pat. No. 3,831,801.

Reference is made to other United States patents showing various valve arrangements and caps with valve arrangements including roll-over valve arrangements as follows:

| Inventor | Pat. Number | Issued | Class | Subclass |
| --- | --- | --- | --- | --- |
| Jensen | 1,893,942 | 1/33 | | |
| Snyder | 2,273,737 | 2/42 | 277 | 71 |
| Abrams | 2,396,233 | 3/46 | 220 | 44 |
| Knowlton | 2,489,787 | 11/49 | 220 | 89 |
| McKalip | 2,496,883 | 2/50 | 220 | 44 |
| Alkire, et al. | 3,064,668 | 11/62 | 137 | 43 |
| Bowden | 3,083,862 | 4/63 | 220 | 44 |
| Marx | 3,123,087 | 3/64 | 137 | 43 |
| Osborne | 3,135,411 | 6/64 | 215 | 60 |
| Colarusso et al. | 3,465,911 | 9/69 | 220 | 86 |
| White | 3,500,843 | 3/70 | 137 | 43 |
| De Frees | 3,568,695 | 3/71 | 137 | 43 |
| Pfrengle | 3,614,960 | 10/71 | 137 | 43 |
| Hall | 3,738,384 | 6/73 | 137 | 493.9, 512.3 512.5 |

U.S. Pat. No. 2,396,233 shows a float chamber in a filler cap and relief vent, the chamber carrying a needle valve for closing a valve opening and the chamber being driven by a steel ball. U.S. Pat. No. 3,123,087 shows a venting cap with a ball 15 arranged to raise a plate to close the passageway during roll-over. The Pfrengle U.S. Pat. No. 3,614,960 shows a venting valve and roll-over valve arrangement remote from the filler cap. U.S. Pat. No. 3,738,384 shows a single valve having five different functions, i.e., pressure relief, vacuum relief, roll-over shut-off, overfill limiting and anti-surge control.

While the prior art has many examples of pressure-vacuum valves and roll-over vacuum valves, the combination valve arrangement of the present invention constitutes a significant improvement over the prior art because it is low in cost, easy to manufacture, and yet very effective for the purpose intended.

It is an object of the present invention, therefore, to provide an improved pressure-vacuum valve venting arrangement for a fuel storage tank with a roll-over valve means effective to close the venting passageway through the cap if the automobile rolls over.

It is an object of the present invention to provide such a pressure-vacuum cap for a chamber having a normally upwardly-extending filler neck formed with a peripherally and radially extending, upwardly facing sealing surface concentric with the longitudinal axis of the neck, the cap comprising a cover, means providing a concentric housing extending downwardly into the filler neck and connected to the cover, means providing a seal between the housing means and the sealing surface, and the housing means including a valve body providing a centrally disposed concentric passageway extending axially therethrough and in communication with the chamber. Pressure-vacuum valve means is disposed in the passageway for normalizing the pressure in the chamber, venting the chamber to atmosphere when the pressure in the chamber exceeds a predetermined superatmospheric level and when the pressure in the chamber drops below a predetermined subatmospheric level. The valve body also provides, in the passageway, a concentric, axially downwardly facing generally spherical valve seat, and a ball disposed in the passageway to move against the valve seat to close the passageway against the movement of fluid from the chamber when the filler neck is tilted downwardly to a predetermined angle relative to a horizontal plane.

Another object of the present invention is to provide such a cap in which the valve body is formed to provide, intermediate the ends of the passageway, an axially upwardly facing peripherally and radially inwardly extending valve seat, and in which the pressure-vacuum valve means includes a circular, disc-like gasket concentrically disposed in the passageway to have its downwardly facing side engage the last-said valve seat, pressure spring means yieldably urging the gasket downwardly into engagement with the last said valve seat, the gasket having a concentric vent opening in the center thereof, a vacuum valve member concentrically disposed in the passageway to close the vent opening in the disc, and vacuum spring means for yieldably urging the vacuum valve member into closing engagement with the downwardly facing side of the gasket.

In one embodiment of the present invention, the downwardly facing, generally spherical seat for the roll-over valve is provided by a plug inserted into the passageway and spaced above the lower end thereof, the plug having a concentric opening extending axially therethrough for venting purposes. When the ball rolls against the spherical seat, that vent opening is closed to close the passageway.

Still another object of the present invention is to provide such a cap in which the passageway upper end portion is formed to have a generally cylindrical portion terminating therebelow with a concentric radially inwardly and downwardly inclining conical seat portion, and in which the pressure-vacuum valve means includes a pressure valve member concentrically disposed in the passageway for sealing engagement with the conical seat portion.

Other objects and features of the present invention will become apparent as this description progresses.

To the accomplishment of the above and related objects, this invention may be embodied in the forms illustrated in the accompanying drawings, attention being called to the fact, however, that the drawings are illustrative only, and that changes may be made in the specific constructions illustrated and described, so long as the scope of the appended claims is not violated.

Figure 1:
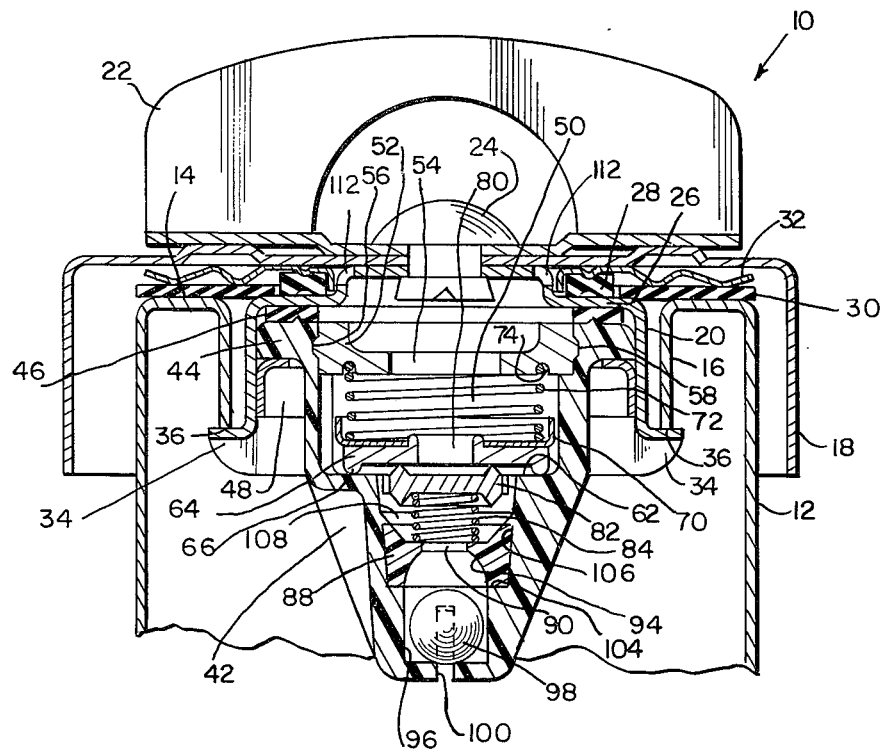
FIG. 1 is a sectional view of one embodiment of the present invention, the section being taken along the center axis of the cap.

Referring now to the drawings and particularly to FIG. 1, it will be seen that I have disclosed an embodiment 10 of the present invention for closing a filler neck 12 of the type having a peripherally and radially extending, upwardly facing sealing surface 14 concentric with the axis of the neck and, at the radially inner edge of that surface 14, a downwardly turned, peripherally extending flange 16 which has a cam profile edge as will be discussed hereinafter. The cap comprises an outer shell or cover 18 to which a cup 20 and handle 22 are rigidly fastened by means of the concentric rivet 24, the cup 20 being a downwardly opening, generally cylindrical cup. The cup provides an upper shoulder 26 spaced axially apart from the cover 18 to define a space therebetween for an inner gasket 28, an outer gasket 30, and a diaphragm spring 32. The gasket 30 bears against both the shoulder 26 of the cup 20 and the sealing surface 14 of the filler neck to provide a seal between the cup 20 and the filler neck. Both the gaskets 28, 30 may be synthetic rubber gaskets and the diaphragm 32 may be a stainless steel diaphragm formed in cross section as illustrated to provide a spring for yieldably urging the outer peripheral edge of the gasket 30 downwardly. The cup 20 is formed with radially outwardly extending ears 34 which conventionally pass downwardly through notches in the sealing surface 14 in the flange 16 to engage the cam lock surface 36 defined by the distal edge of the flange 16. Twisting of the shell 18 by the handle 22, of course, conventionally rotates the cap to move the cup 20 axially inwardly to press the gasket 30 downwardly against the sealing surface 14.

The cup 20 and a valve housing or valve body 42 extending upwardly into the open end of the cup comprise housing means connected to the cover 18 and extending downwardly into the filler neck as discussed previously. The illustrative valve housing or valve body 42 comprises an upper, radially outwardly and peripherally extending shoulder 44 which captures a synthetic rubber gasket 46 between its upper surface and the downwardly facing surface of the shoulder 26 of the cup. A locking ring 48 is inserted into the cup and there locked by conventional means to secure the valve body 42 in its illustrated position. Indentations or tangs may be formed in the wall of the cup 20 to secure the ring 48.

It will be appreciated that the valve body 42 may preferably be a molded plastic shell having a bore extending most of the way axially therethrough defining a passageway 50. There is an upper plug 52 with a concentric opening 54 therein inserted into the upper end of the passageway 50. The passageway may be formed with a peripherally extending groove 56 and the plug 52 may have a peripherally and radially outwardly extending tongue 58 which snaps into engagement with that groove as illustrated.

It can be seen that the illustrative valve body 42 is provided with a peripherally and radially inwardly extending pressure valve seat 62 to be engaged by a disc-like valve member 64 which, in the illustrative embodiment, has a peripherally and downwardly extending sealing ridge 66 at its radially outer edge resting upon the valve seat 62. A spring cup 70 is conventionally placed upon the disc 64 and a coiled compression spring serves as the pressure spring means yieldably urging the valve member or gasket 64 into closing engagement with the valve seat 62. The upper end of the spring 72 is received in a concentric, downwardly opening groove 74.

The valve member 64 is provided with a concentric, vacuum vent opening 80 extending therethrough, and the embodiment 10 comprises a vacuum valve member 82 which is yieldably urged against the lower surface of the valve member 64 to close the vent opening 80 by a spring 84. In the illustrative embodiment, the lower end of the spring 84 rests upon another plug 88 which is inserted downwardly into the valve body before it is assembled to the cup 20 and which has a vent passageway 90 therethrough. This plug 88 is formed to provide a concentric, axially downwardly facing generally spherical valve seat 94 which is in registry with the lower portion 96 of the passageway through the valve body. A stainless steel ball 98 is disposed in the lower portion 96 of the passageway to roll freely therein. The distal end or lower end of the valve body is provided with a transaxially extending slot 100 which serves to vent the lower portion 96 of the passageway into the filler neck and chamber.

In the illustrative embodiment 10, the valve body 42 is formed to provide, in the passageway extending therethrough, a peripherally and radially inwardly extending ledge 104 upon which the plug 88 rests. The wall of the passageway above that ledge and the conforming wall of the plug is slightly conical flaring upwardly and slightly outwardly to integrally formed means 108 projecting inwardly. The plug 88 may be, for instance, soft enough or resilient enough to snap past the peripherally and inwardly extending projecting means 108 which serves to hold the plug 88 downwardly against the ledge 104.

The embodiment 10, and the embodiments 10A, 10B discussed hereinafter are constructed such that several different types of valve bodies 42 can be inserted into the open end of the cup 20 to be secured there. This gives considerable manufacturing flexibility in that a plurality of different types of valve bodies 42 can be fabricated as subassemblies having various pressure spring and vacuum spring calibrations to meet the various requirements. Then, such subassemblies can be selectively inserted into the cups 20 and secured there to complete the total cap assembly.

With the above description in mind, it will be appreciated that the pressure-vacuum valve means works in the following manner: When the pressure in the fuel tank exceeds a predetermined superatmospheric level, the calibrated spring 72 will compress to permit vapors in the tank to escape between the valve member 64 and the valve seat 62 upwardly and outwardly through peripherally spaced apart vent openings 112 in the cup 20 upper portion and then radially outwardly through upwardly projecting, downwardly opening troughs (not shown) in the top surface of the cover 18. Such troughs extend radially outwardly beyond the outer extent of the diaphragm 32 so that the vapors exhausted from the tank can escape from the filler neck. Then, when the pressure in the tank drops below a predetermined subatmospheric level, the calibrated spring 84 compresses to permit air to move from the atmosphere through the vent openings 112 and the vent opening 80 past the vacuum valve member 82 and into the tank.

In order to prevent the flow of fuel through the valve body 42 if the automobile rolls over, the lower passageway portion 96, ball 98 and spherical seat 94 are proportioned such that, as the car rolls over, the ball 96 will roll into the spherical seat to close the opening 90 through the plug 88.

Figure 2:
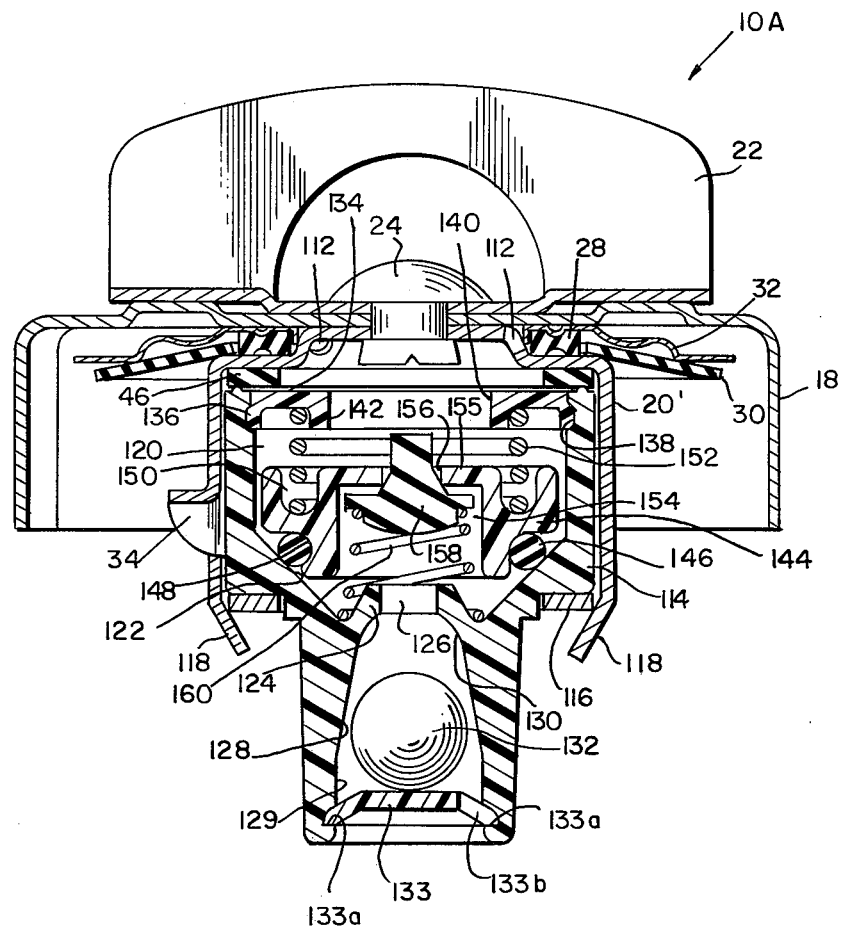
FIG. 2 is another sectional view of another embodiment of the present invention.
Figure 3:
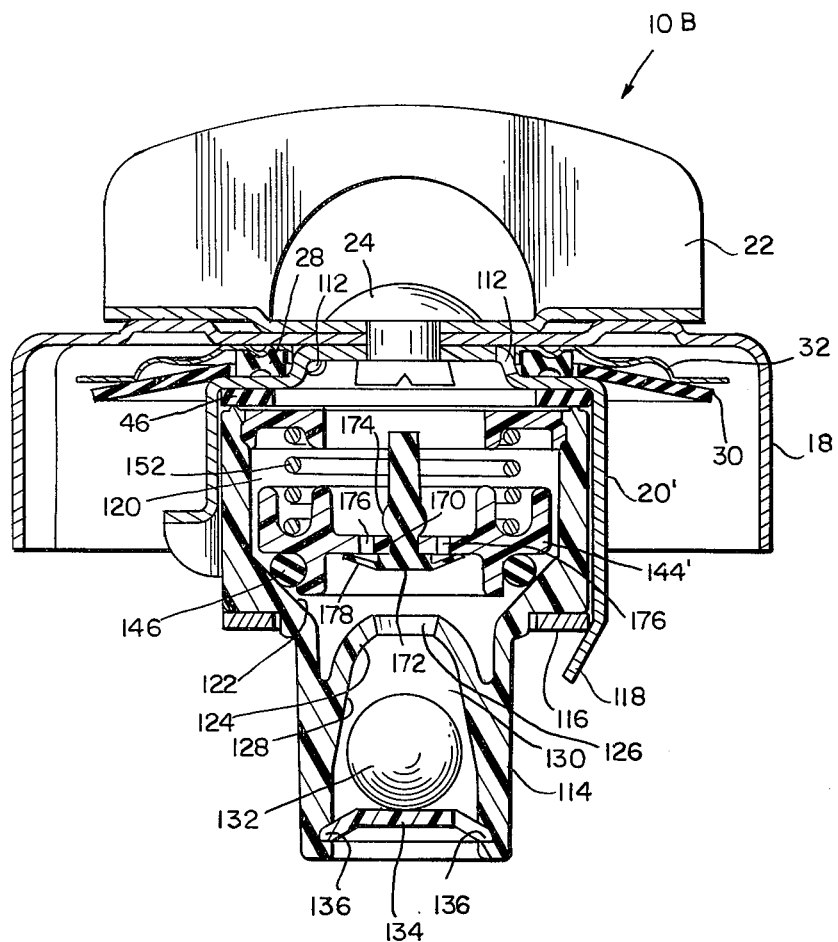
FIG. 3 is another sectional view of still another embodiment of the present invention.

Referring now to FIGS. 2 and 3, like reference numerals representing like parts, and some reference numerals being primed to show changes in parts, it will be seen that different types of valve bodies can be inserted into and locked into the cup. In the embodiment 10A of FIG. 2, the valve housing or valve body is indicated by the reference numeral 114 and it is secured into the cup 20' by a metal washer 116 which is conventionally secured in place by bent inwardly tangs 118 provided on the distal edge of the cup. The axially upper portion of the passageway of the valve body 114 is formed to be concentric and cylindrical as indicated at 120 and to terminate therebelow with a concentric downwardly and inwardly extending conical seat portion 122. The lower region of the conical seat 122 terminates at a concentric and axially upwardly extending abutment 124 having a concentric opening 126 extending therethrough. The axially lower portion of the valve body 114 is formed to provide a lower passageway portion 128 which is, for a large part of its axial extent, slightly conically to flare downwardly and slightly outwardly to a lower cylindrical portion 129. The uppermost portion of the passageway 128 is formed to provide a concentric, axially downwardly facing generally spherical valve seat 130 in concentric registry with the opening 126. A stainless steel ball 132 is disposed in the passageway 128 portion to be movable therein into closing relationship with the vent opening 126. The ball 132 is retained in the passageway by means of a retainer 133 which may be snapped into the peripherally extending groove 133a, the retainer having vent openings therein as indicated by 133b.

The subassembly of the valve body 114 is completed or closed by inserting an upper plug 134 into the upper end of the passageway 120, the peripherally and outwardly extending tongue 136 of the plug snapping into engagement with the peripherally extending groove 138 in the passageway. The plug 134 has a vent opening 140 therethrough which is bounded by a peripherally and downwardly extending concentric rim 142. In this embodiment 10A, the pressure valve means includes a pressure valve member 144 having a concentric O-ring seal 146 which concentrically engages the conical seat 122, the ring being received in a concentric groove 148 formed in the valve member. The valve member 144 is also provided with an upwardly opening groove 150 receiving the lower end of the coiled compression spring 152, the upper end of which seats about the rim 142. In order to provide a vacuum valve means, the valve member 144 is provided with a downwardly opening hollow 154 defined by an upper, generally horizontally extending web portion 155 having a concentric vacuum vent opening 156 therethrough. A tapered plug-type valve member 158 is yieldably urged into closing engagement with that opening 156 by means of a coiled compression spring 160 which seats upon the aforesaid abutment 124. That spring 160 is, of course, the vacuum spring of the cap 10A.

Referring now specifically to FIG. 3, it will be seen that the primary difference between the structures of FIGS. 2 and 3 is in the shape of the valve members 144, 144' and the type of vacuum valve utilized. The valve member 144' of the embodiment 10B of FIG. 3 includes a center opening 170 into which a vacuum valve member 172 is inserted, the valve member 172 having an upwardly extending shaft with a bulbous portion 174 which passes upwardly through the opening 170 and which serves to secure the member 172 to the member 144'. Then, peripherally spaced apart about the center opening 170 are smaller vent openings 176. The valve member 172 is formed to have a peripherally and radially outwardly extending resilient flap portion overlying the vent openings 176. When the pressure in the tank drops below a predetermined subatmospheric level, the flap portion 178 of the valve member 172 deflects downwardly to permit movement of atmospheric air downwardly through the vent openings 176 into the tank.

I claim:

1. A pressure-vacuum cap for a chamber having a normally upwardly extending filler neck formed with a peripherally and radially extending, upwardly facing sealing surface concentric with the longitudinal axis of said neck, said cap comprising a cover, means providing a concentric housing extending downwardly into said filler neck and connected to said cover, means providing a seal between said housing means and said sealing surface, said housing means including a valve body providing a centrally disposed concentric passageway extending axially therethrough and in communication with said chamber, pressure-vacuum valve means disposed in said passageway for normalizing the pressure in such a chamber, venting the chamber to atmosphere when the pressure in the chamber exceeds a predetermined superatmospheric level and when the pressure in the chamber drops below a predetermined subatmospheric level, said valve body including, in said passageway, a resilient plug providing a concentric, axially downwardly facing valve seat with a concentric venting opening extending axially therethrough, and a ball disposed in said passageway to move into closing engagement with said valve seat to close said passageway against the movement of fluid from said chamber when the filler neck is tilted downwardly to a predetermined angle relative to a horizontal plane.

2. The invention of claim 1 in which said valve body is formed to provide, intermediate the ends of said passageway, an axially upwardly facing peripherally and radially inwardly extending valve seat, said pressure-vacuum valve means including a circular, disc-like gasket concentrically disposed in said passageway to have its downwardly facing side engage the last said valve seat, pressure spring means yieldably urging said gasket downwardly into engagement with the last said valve seat, said gasket having a concentric vent opening in the center thereof, a valve member concentrically disposed in said passageway to close said vent opening in said disc, and vacuum spring means for yieldably urging said valve member into closing engagement with the downwardly facing side of said gasket, said valve body being formed with its lower end portion at least partially closed to trap said ball against movement downwardly out of said passageway, said plug being disposed above said lower end portion and said ball to trap said ball against movement upwardly.

3. The invention of claim 2 in which said valve body is a molded plastic shell having a bore therethrough defining said passageway, said bore having an upwardly facing, peripherally and generally radially inwardly extending ledge upon which said resilient plug rests.

4. The invention of claim 3 in which said bore is formed with radially inwardly projecting means spaced upwardly from said ledge to engage said plug and hold it downwardly against said ledge.

5. A pressure-vacuum cap for a chamber having a normally upwardly extending filler neck formed with a peripherally and radially extending sealing surface concentric with the longitudinal axis of said neck, said cap comprising a cover, a valve body providing a centrally disposed passageway extending axially therethrough concentric with and in communication with said filler neck, means for connecting said valve body to said cover so that said valve body extends axially downwardly into said filler neck, means for providing a seal between said valve body and said sealing surface, said valve body and its passageway having an axially upper end portion and an axially lower end portion, pressure-vacuum valve means disposed in the upper end portion of said passageway for normalizing the pressure in such a chamber, venting the chamber to atmosphere when the pressure in the chamber exceeds a predetermined superatmospheric level and when the pressure in the chamber drops below a predetermined subatmospheric level, a resilient plug inserted into the lower portion of said passageway, said soft plug being formed to provide a concentric, axially downwardly facing valve seat, and a valve ball disposed in the lower end portion of said passageway to move into closing engagement with said valve seat to close said passageway against the movement of fluid from said chamber when the filler neck is tilted downwardly to a predetermined angle relative to a horizontal plane.

* * * * *